United States Patent
Feng et al.

(10) Patent No.: US 11,118,636 B2
(45) Date of Patent: Sep. 14, 2021

(54) CLUTCH CONTROL VALVE ASSEMBLY HAVING ARMATURE WITH ANTI-ADHESION SURFACE TREATMENT

(71) Applicant: Caterpillar Inc., Peoria, IL (US)

(72) Inventors: Bao Feng, Peoria, IL (US); Andrew Henry Nippert, Peoria, IL (US); Qursheed Hussain Mohammed, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 16/653,480

(22) Filed: Oct. 15, 2019

(65) Prior Publication Data

US 2021/0108686 A1     Apr. 15, 2021

(51) Int. Cl.
  *F16D 25/12* (2006.01)
  *F16D 48/02* (2006.01)

(52) U.S. Cl.
  CPC ............. *F16D 25/14* (2013.01); *F16D 48/02* (2013.01); *F16D 2048/0221* (2013.01)

(58) Field of Classification Search
  CPC ... F16D 25/14; F16D 48/02; F16D 2048/0221
  See application file for complete search history.

(56) References Cited

U.S. PATENT DOCUMENTS

| | | | |
|---|---|---|---|
| 5,856,771 A * | 1/1999 | Nippert | H01F 7/1607 251/129.15 |
| 6,223,113 B1 | 4/2001 | McCunn et al. | |
| 6,715,693 B1 | 4/2004 | Dam et al. | |
| 6,860,293 B2 * | 3/2005 | Douglass | F16D 25/14 137/596.17 |
| 7,484,672 B2 * | 2/2009 | Campion | C23C 14/025 239/533.2 |
| 7,942,343 B2 * | 5/2011 | Campion | C23C 14/0641 239/88 |
| 8,033,956 B2 * | 10/2011 | Takahashi | F15B 13/0433 477/34 |
| 2003/0084946 A1 * | 5/2003 | Douglass | F16D 48/02 137/625.64 |
| 2004/0251312 A1 * | 12/2004 | Campion | F02M 59/44 239/88 |
| 2008/0179430 A1 * | 7/2008 | Campion | C23C 14/0635 239/591 |

(Continued)

FOREIGN PATENT DOCUMENTS

| | | |
|---|---|---|
| CN | 206329793 U | 7/2017 |
| CN | 108374925 A | 8/2018 |
| GB | 2291934 A | 2/1996 |

*Primary Examiner* — David R Morris
(74) *Attorney, Agent, or Firm* — Brannon Sowers & Cracraft

(57) ABSTRACT

A transmission system includes a clutch control valve assembly having an armature for adjusting a valve, rested upon metallic slide bearings under the force of gravity. The armature includes a core material that is metallic and magnetically soft, an outer thin-film coating that is non-metallic, and a backing substrate material for supporting the outer thin-filmed coating interposed the core material and the outer thin-film coating. The backing substrate material may be case hardened material derived from the core material, such as ferritic nitrocarburized (FNC) iron. The outer thin film coating may be a diamond-like carbon (DLC) material.

15 Claims, 4 Drawing Sheets

(56) References Cited

U.S. PATENT DOCUMENTS

2009/0093338 A1* 4/2009 Takahashi ............... F16D 48/02
477/51
2016/0097428 A1 4/2016 Calvert

* cited by examiner

CLUTCH CONTROL VALVE ASSEMBLY HAVING ARMATURE WITH ANTI-ADHESION SURFACE TREATMENT

TECHNICAL FIELD

The present disclosure relates generally to a clutch control valve assembly, and more particularly to an armature for a clutch control valve assembly having a surface treatment for inhibiting adhesion of metallic bearing material.

BACKGROUND

Many different types of modern machinery utilize transmissions for varying gear ratios amongst rotating components. A typical example includes a transmission system in a drive or propulsion system for a ground-engaging machine. A plurality of different clutches may be used to selectively engage different gears or geartrains within a transmission coupled between a source of rotational power, such as an engine, and a final drive that rotates ground engaging elements of the machine. In off-highway applications, transmission system components can be subjected to relatively harsh conditions. The subsystems for engaging and disengaging clutches are often robustly designed to operate under service conditions that can include frequent engagement and disengagement, transfer of high rotational torques, and relatively high operating pressures and temperatures.

Controls for clutch engagement and disengagement in such systems are typically electro-hydraulic, employing one or more electrically actuated valves that vary a pressure of hydraulic fluid that is supplied to a clutch in the transmission system. One known design for electro-hydraulic clutches in a transmission system is set forth in U.S. Pat. No. 6,223,113B1.

SUMMARY OF THE INVENTION

In one aspect, a machine includes a frame structured to couple with ground-engaging elements for supporting the machine vertically above a ground surface, and a transmission system supported by the frame and including a transmission, a clutch, and a clutch control valve assembly. The clutch control valve assembly includes a solenoid, a plurality of slide bearings that are metallic, and an armature. The armature is rested upon the plurality of slide bearings and movable, in response to varying an electrical energy state of the solenoid, in a horizontal direction between a retracted position and an advanced position. The armature includes a core material that is metallic and magnetically soft, an outer thin-film coating that is non-metallic and in contact with the plurality of slide bearings, and a backing substrate material that is metallic and interposed the core material and the outer thin-film coating.

In another aspect, a transmission system for a machine includes a clutch, and a clutch control valve assembly including a valve housing, a valve, a solenoid, a plurality of slide bearings that are metallic, and an armature for adjusting a position of the valve so as to adjust the clutch between an engaged state and a disengaged state. The armature is rested upon the plurality of slide bearings under the force of gravity and movable, in response to varying an electrical energy state of the solenoid in a horizontal direction between a retracted position and an advanced position. The armature includes a core material that is metallic and magnetically soft, an outer thin-film coating that is non-metallic and in contact with the plurality of slide bearings, and a backing substrate material that is metallic and interposed the core material and the outer thin-film coating.

In still another aspect, a clutch control valve assembly for a clutch in a transmission system includes a valve housing, a solenoid, an armature, and slide bearings supporting the armature for movement within the valve housing between a retracted position and an advanced position in response to varying an electrical energy state of the solenoid. The clutch control valve assembly further includes a valve coupled with the armature and movable between an open position and a closed position, based on the movement of the armature between the retracted position and the advanced position. The armature includes a core material that is metallic and magnetically soft, an outer thin-film coating that is non-metallic and in contact with the slide bearings, and a backing substrate material that is metallic and interposed the core material and the outer thin-film coating.

DETAILED DESCRIPTION

Figure 1:
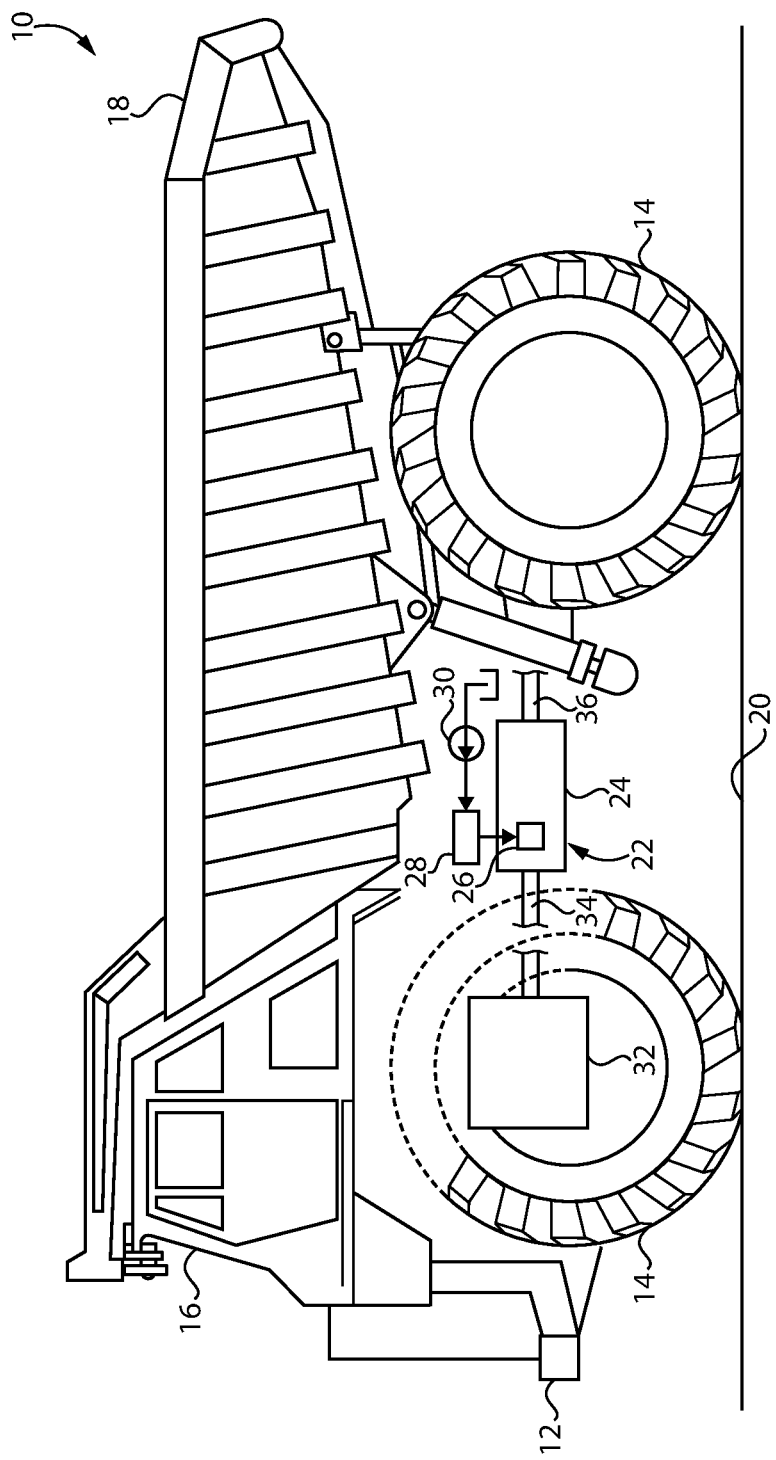
FIG. 1 is a diagrammatic side view of a machine, according to one embodiment.

Referring to FIG. 1, there is shown a machine 10 according to one embodiment. Machine 10 includes a frame structured to couple with, and as illustrated actually coupled with, ground-engaging elements 14 for supporting machine 10 vertically above a ground surface 20. Machine 10 is shown in the context of an off-highway mining truck having an operator cab 16 supported upon frame 12 and positioned forwardly of a dump bed 18. Other off-highway machines are contemplated within the context of the present disclosure, such as backhoes, loaders, motor graders, tractors, and a variety of other equipment. Machine 10 also includes a transmission system 22 supported by frame 12, and including a transmission 24, a clutch 26, and a clutch control valve assembly 28. Transmission 24 can include appropriate gearing for providing a plurality of different gear ratios for operating and rotating ground-engaging elements 14 for propelling machine 10. Machine 10 may also include an engine 32, such as a diesel or dual fuel engine or a diesel electric hybrid, structured to provide rotational power to an input shaft 34 of transmission 24, ultimately rotating an output shaft 36 of transmission 24 to operate ground-engaging elements 14. Those skilled in the art will be familiar with many of the internal components that might be provided in transmission 24, including differential geartrains, a plurality of different clutches, and still others, and thus such components apart from clutch 26 are omitted from the FIG. 1 illustration for convenience. It should be appreciated transmission system 22 might include a plurality of clutches of similar construction or operated analogously to clutch 26, and thus the present description of clutch 26 in the singular should be understood by way of analogy to refer to any clutches that might be used in transmission system 22.

Transmission system 22 can further include a hydraulic pump 30 structured to provide pressurized hydraulic fluid, by way of clutch control valve assembly 28, to clutch 26 for adjusting clutch 26 from a disengaged state to an engaged state, for example. Clutch control valve assembly 28 may be structured to selectively provide the pressurized hydraulic fluid, or low pressure, to enable clutch engagement and disengagement in a suitable manner as further discussed herein. Clutch control valve assembly 28 will typically be electronically controlled, with an operator or an on-board electronic control unit (ECU) operating clutch control valve assembly 28 to provide the desired outcome as further discussed herein. It will be recalled that ground-engaging elements 14 support frame 12 and machine 10 vertically above ground surface 20. As used herein, the term "vertically" or "vertical" should be understood in reference to machine 10 itself as a reference frame, with "horizontally" or "horizontal" analogously understood, and referring to directions generally transverse to the vertical. As will be further apparent from the following description, certain components of transmission system 22 are horizontally oriented and/or move in horizontal directions, leading to challenges that are addressed by way of technical solutions of the present disclosure.

Figure 2:
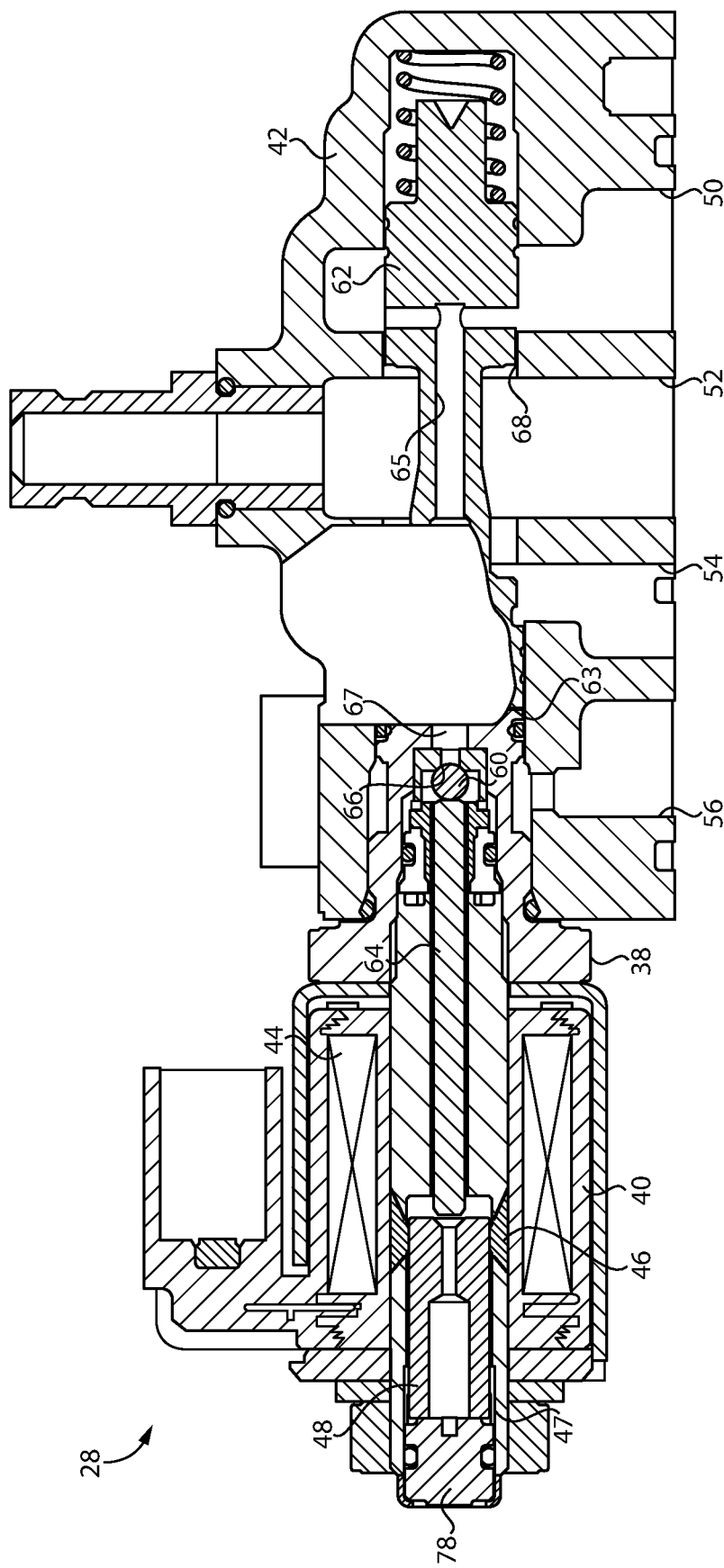
FIG. 2 is a sectioned side diagrammatic view of a clutch control valve assembly, according to one embodiment.

Referring also now to FIG. 2, there is shown clutch control valve assembly 28 in additional detail. Clutch control valve assembly 28 includes a solenoid coil 44 (hereinafter "solenoid 44") structured to electrically connect with an electrical power supply (not shown), a plurality of slide bearings 46 and 47 that are metallic, and an armature 48. Clutch control valve assembly 28 also includes a valve housing 38, having a first housing piece 40 and a second housing piece 42 in the illustrated embodiment. Valve housing 38 could be of any suitable design and have any number of housing pieces. Clutch control valve assembly 28 also includes a valve, which can include a pilot valve 60, coupled with armature 48, and a pilot-operated clutch pressure control valve or main valve 62. Armature 48 is supported by slide bearings 46 and 47, rested under the force of gravity upon slide bearings 46 and 47 when installed for service or testing, and movable, in response to varying an electrical energy state of solenoid 44, in a horizontal direction between a retracted position and an advanced position.

Clutch control valve assembly 28 further includes a pusher pin 64 coupled between armature 48 and pilot valve 60. Armature 48, pilot valve 60, pusher pin 64, and main valve 62 are arranged coaxially in valve housing 38 in the illustrated embodiment. Varying the electrical energy state of solenoid 44, which may include energizing solenoid 44, causes armature 48 to slide through slide bearings 46 and 47 to contact pusher pin 64, which communicates the motion of armature 48 to pilot valve 60. Also formed in valve housing 38 is a pilot valve seat 66. Pilot valve 60 can include a spherical ball valve in some embodiments, although the present disclosure is not thereby limited, movable between a closed position blocking pilot valve seat 66, and an open position. Main valve 62 is movable within valve housing 38 between a first position, or closed position, approximately as shown in FIG. 2, and a second position, or open position. Main valve 62 includes a control surface 63 exposed to a fluid pressure that is varied based on a position of pilot valve 60. Valve housing 38, and in the illustrated embodiment housing piece 42, has a supply pressure inlet 50 formed therein that may be fluidly connected to pump 30, for instance. Housing piece 42 also has a clutch control pressure outlet 52 formed therein, a main drain 54, and a pilot drain 56. Main valve 62 has a control edge 68 positioned to move with movement of clutch pressure control valve 62 to permit selectively fluidly connecting supply pressure inlet 50 to clutch control pressure outlet 52, or blocking that fluid connection.

When solenoid 48 is deenergized, armature 48 may be moved horizontally (retracted) toward contact with a stop 78, relieving a closing force provided by pusher pin 64 on pilot valve 60, and permitting fluid flow through pilot valve seat 66, reducing an actuating pressure on control surface 63 of main valve 62. In such an instance, the various components may assume a state approximately as shown in FIG. 2. When pilot valve 60 blocks pilot valve seat 66, pressure is permitted to build between pilot valve 60 and clutch pressure control valve 62, imparting a tendency for main valve 62 to move to the right so that control edge 68 permits communication of supply pressure from supply pressure inlet 50 to clutch pressure outlet 52. Opening fluid communication as described provides an increased fluid pressure that can actuate and lock up clutch 26. In the embodiment shown, hydraulic fluid can be conveyed through a passage 65 formed in main valve 62 to a space or clearance 67 formed between pilot valve 60 and control surface 63 of main valve 62, and then drain past pilot valve seat 66 to pilot drain 56 until such time as solenoid 44 is energized and armature 48 moves to close pilot valve seat 66. A variety of other design strategies could be used for providing fluid at supply pressure, or providing drain pressure, to, between, and among the various components of clutch pressure control valve assembly 28 shown in FIG. 2.

Figure 3:
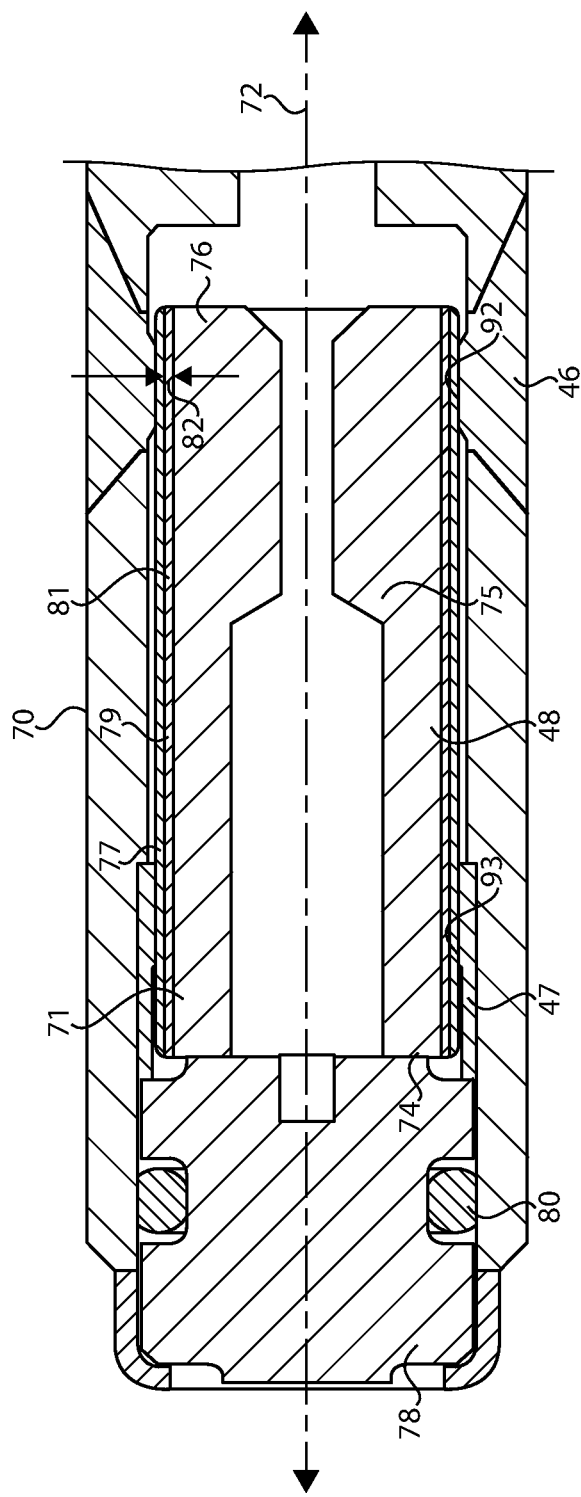
FIG. 3 is a sectioned side diagrammatic view of a portion of the clutch control valve assembly of FIG. 2.

Referring also now to FIG. 3, there are shown aspects of clutch control valve assembly 28 in further detail. Armature 48 includes an elongate generally cylindrical armature body 71. A seal 80, such as an O-ring seal, is positioned to fluidly seal between stop 78 and a sleeve 70 that is part of valve housing 38. It will be recalled that armature 48 is rested upon slide bearings 47 and 48 under the force of gravity. Each of slide bearings 47 and 48 in clutch control valve assembly 28 is metallic and may be formed of bronze. In the illustrated embodiment a total of two slide bearings 47 and 48 is used, each extending circumferentially around elongate armature body 71 at each of the retracted position and the advanced position of armature 48. The rightmost slide bearing 48 can include a brazed slide bearing attached by brazing, for instance, with sleeve 70. The leftmost slide bearing 47 can include a pressed-in or otherwise interference-fitted bearing. Armature 48 defines a longitudinal axis 72 that extends between a first axial end 74 of elongate cylindrical armature body 71, and a second axial end 76 of elongate cylindrical armature body 71. Armature 48 may be free floating, where its position is controlled by the electrical energy state of solenoid 44 and hydraulic fluid pressure. In other instances, armature 48 could be spring-biased, toward its retracted position in opposition to magnetic pulling force produced by solenoid 44. Main valve 62 may also be spring-biased, for example, to the first position where control pressure outlet 52 is connected fluidly to main drain 54 as in FIG. 2, such that upon opening pilot valve 60 by deenergizing solenoid 44, spring biasing urges main valve 62 to the first position.

As also noted above, armature 48 may be structured for improved resistance to performance degradation that may occur in certain other clutch control valve assembly designs and is surface treated to inhibit adhesion between bearing material and armature material. To this end, armature 48 includes a core material 75 that is metallic and magnetically soft. In an implementation, core material 75 includes a magnetically soft iron, such as IE303 or another steel having low enough carbon content so that core material 75 does not tend to become permanently magnetized based on the electromagnetic operation of solenoid 44. Armature 48 further includes an outer thin-film coating 77 that is non-metallic and in contact with slide bearings 47 and 48. Slide bearings 47 and 48 can each include an inner peripheral surface 93 and 92, respectively, in contact with outer thin-film coating 77. In a practical implementation, outer thin-film coating 77 can include a diamond like carbon (DLC) material. Other suitable materials for outer thin film coating 77 are available under the trade name RF85™.

Armature 48 also includes a backing substrate material 79 that is metallic and interposed core material 75 and outer thin-film coating 77. Also, in a practical implementation strategy, elongate cylindrical armature body 71 includes a hardened case 81. Hardened case 81 may be derived from core material 75, and forms backing substrate material 79. Backing substrate material 79 may include iron containing carbon and/or nitrogen diffused therein as can be produced by a variety of case hardening techniques. A hardness of backing substrate material 79 is less than a hardness of outer thin-film coating 77, and greater than core material 75. Backing substrate material 79 is magnetically harder than core material 75. In one embodiment, backing substrate material 79 is ferritic nitrocarburized (FNC) iron. FNC case hardening of core material 75 provides a suitable case hardening technique that can be implemented with heat treatment temperatures below temperatures where iron of core material 75 undergoes a phase change. A thickness 82 of backing substrate material 79 may be from about 0.005 millimeters to about 0.025 millimeters. In many instances, it will be desirable to limit a depth of case hardening to less than a depth where the case hardening begins to interfere with magnetic properties of armature 48, yet is thick enough to provide robust support for outer thin-film coating 77 to limit peeling, fracturing or other forms of degradation. In a further refinement, thickness 81 may be about 0.020 millimeters. The term "about" should be understood herein as meaning generally, approximately, or substantially equal to the listed values within measurement error.

INDUSTRIAL APPLICABILITY

Relatively precise, accurate, and predictable control over clutch pressure in a transmission system is desirable for many reasons. When an operator, or autonomous control system, establishes that conditions are suitable for a gear change, it is typically necessary for a clutch to be engaged and another clutch disengaged relatively quickly and reliably. It has been observed in certain transmission systems that performance of armatures generally analogously configured to those disclosed herein can degrade over time based apparently upon adhesion between bearing material and armature material. In particular, it has been observed that metal-to-metal contact of an armature formed of magnetically soft iron and other metals such as bronze bearings can result in bearing material being transferred onto the armature. As a result, the armature can "stick," and inhibit proper clutch operation altogether, or require relatively greater electrical power in energizing a solenoid than what is optimal. Such phenomena can be expected to be especially troublesome for horizontally oriented armatures where a bottom side of the armature rests under the force of gravity in contact with slide bearings and adhered bearing material eventually develops on the bottom side of the armature.

Figure 4:
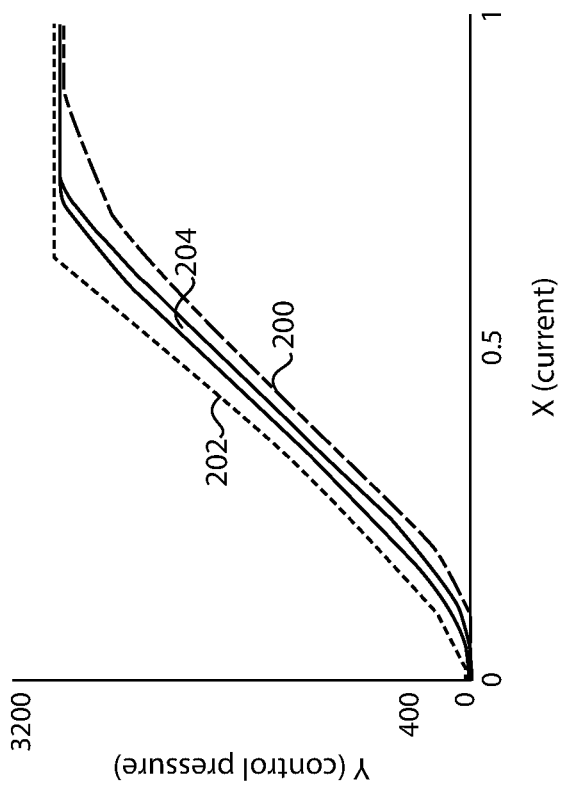
FIG. 4 is a graph showing electrical current in comparison with clutch control pressure, in a transmission system having a first type of armature surface treatment in a clutch control valve assembly.
Figure 5:
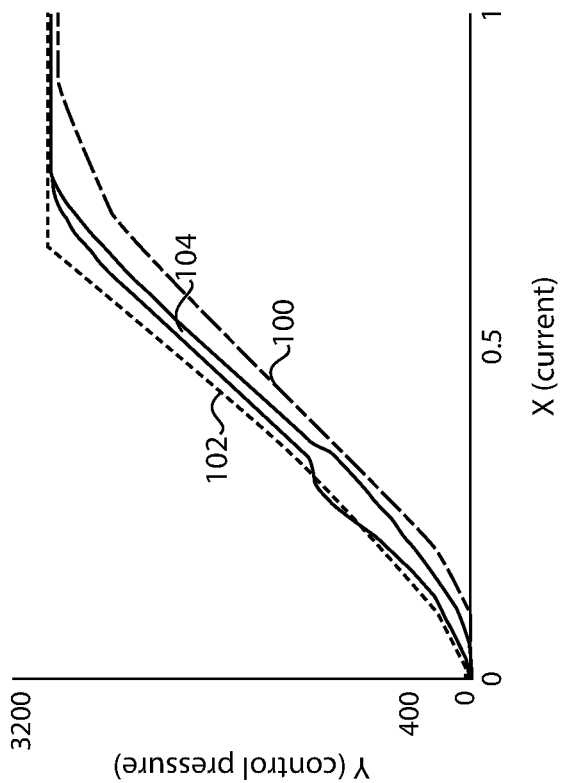
FIG. 5 is a graph showing electrical current in comparison with clutch control pressure in a transmission system having another type of armature surface treatment in a clutch control valve assembly.

DLC coatings, and other non-metallic coatings that are hard and slick, may have adhesion problems when placed upon certain substrates such as magnetically soft irons, and can peel away, fracture, or otherwise degrade, eventually returning the interface to metal-to-metal. For these reasons efforts to coat DLC directly upon magnetically soft irons may fail to provide performance improvements, at least over time. Attempts at providing a harder or more robust metal-to-metal interface by hardening exterior material of the armature may also be insufficient to provide acceptable performance results. Referring to FIG. 4, there is shown electrical current (Amperes) for solenoid energization on the X-axis, in comparison with clutch control pressure (kilopascals) on the Y-axis for a clutch control valve assembly subjected to several weeks of dither testing. An upper acceptable performance threshold is shown at 102, and a lower acceptable limit threshold is shown at 100. A band 104 is shown representing the actual functioning of the valve over time. An armature in the example of FIG. 3 is surface treated with an FNC process but no outer coating, such that the armature and bearing interface is FNC iron to bronze. It can be seen that band 104 shows excursions outside of upper limit threshold 102, at least between 0 and 0.5 Amperes. Sticking, sticking then rapidly sliding, or other undesired phenomena can result in such excursions, ultimately leading to clutch pressures that are two high or too low, or occur at the wrong time, resulting in a clutch failing to engage or failing to disengage when or in a manner that is desired. It is believed the apparatus in the FIG. 4 example experiences adhesion and transfer of materials between components due to the metal-to-metal contact. In contrast, shown in FIG. 5 is a band 204 for a clutch control valve assembly where an armature is surface treated with an FNC case hardening process, and also a DLC outer thin-film coating upon the FNC iron. Thus, the non-metallic DLC coating contacts bronze bearings as in the present disclosure. It can be seen that band 204 is within a lower limit threshold 200 and an upper limit 202 at all conditions, indicating that the DLC coating has remained in place and transfer of material between the bearings and armature has been prevented.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms, Further, the phrase "based on" is intended to mean "based, at least in part, on" unless explicitly stated otherwise.

What is claimed is:

1. A machine comprising:
   a frame structured to couple with ground-engaging elements for supporting the machine vertically above a ground surface;
   a transmission system supported by the frame, and including a transmission, a clutch, and a clutch control valve assembly;
   the clutch control valve assembly including a solenoid, a plurality of slide bearings that are metallic, and an armature;

the armature being rested upon the plurality of slide bearings and movable, in response to varying an electrical energy state of the solenoid, in a horizontal direction between a retracted position and an advanced position;

the armature including a core material that is metallic and magnetically soft, an outer thin-film coating that is non-metallic and in contact with the plurality of slide bearings, and a backing substrate material that is metallic and interposed the core material and the outer thin-film coating;

the clutch control valve assembly further includes a pilot valve coupled with the armature, and a pilot-operated clutch pressure control valve;

the armature includes an elongate cylindrical armature body; and the elongate cylindrical armature body includes a hardened case, derived from the core material, forming the backing substrate material.

2. The machine of claim 1 wherein the plurality of slide bearings includes a total of two slide bearings each extending circumferentially around the elongate armature body.

3. The machine of claim 2 wherein each of the plurality of slide bearings is formed of bronze.

4. The machine of claim 1 wherein the backing substrate material includes ferritic nitrocarburized (FNC) iron.

5. The machine of claim 1 wherein a thickness of the hardened case is from about 0.005 millimeters to about 0.025 millimeters.

6. The machine of claim 5 wherein the outer thin-film coating includes a diamond-like carbon (DLC) material.

7. A transmission system for a machine comprising:
a clutch;
a clutch control valve assembly including a valve housing, a valve, a solenoid, a plurality of slide bearings that are metallic, and an armature for adjusting a position of the valve so as to adjust the clutch between an engaged state and a disengaged state;
the armature being rested upon the plurality of slide bearings under the force of gravity and movable, in response to varying an electrical energy state of the solenoid, in a horizontal direction between a retracted position and an advanced position; and
the armature including a core material that is metallic and magnetically soft, an outer thin-film coating that is non-metallic and in contact with the plurality of slide bearings, and a backing substrate material that is metallic and interposed the core material and the outer thin-film coating; and
the armature includes an elongate cylindrical armature body having a hardened case, derived from the core material, and forming the backing substrate material.

8. The transmission system of claim 7 wherein each of the plurality of slide bearings is formed of bronze.

9. The transmission system of claim 8 wherein the plurality of slide bearings includes an interference-fitted bearing and a brazed bearing, each including an inner peripheral surface in contact with the outer thin-film coating.

10. The transmission system of claim 7 wherein:
the backing substrate material is ferritic nitrocarburized (FNC) iron, and has a thickness from about 0.005 millimeters to about 0.025 millimeters.

11. The transmission system of claim 10 wherein the outer thin-film coating includes a diamond-like carbon (DLC) material.

12. The transmission system of claim 10 wherein the thickness of the backing substrate material is about 0.020 millimeters.

13. The transmission system of claim 7 wherein the outer thin-film coating includes a diamond-like carbon (DLC) material.

14. A clutch control valve assembly for a clutch in a transmission system comprising:
a valve housing;
a solenoid;
an armature;
slide bearings supporting the armature for movement within the valve housing between a retracted position and an advanced position in response to varying an electrical energy state of the solenoid;
a valve coupled with the armature and movable between an open position and a closed position, based on the movement of the armature between the retracted position and the advanced position;
the armature including a core material that is metallic and magnetically soft, an outer thin-film coating that is non-metallic and in contact with the slide bearings, and a backing substrate material that is metallic and interposed the core material and the outer thin-film coating;
the armature defines a longitudinal axis;
the valve includes a pilot valve;
the clutch control valve assembly further includes a pusher pin coupled between the armature and the pilot valve, and a pilot-operated clutch pressure control valve; and
the armature, the pilot valve, the pusher pin, and the pilot-operated clutch pressure control valve are arranged coaxially in the valve housing.

15. The clutch control valve assembly of claim 14 wherein:
the core material includes iron;
the backing substrate material includes iron and is derived from the core material; and
the outer thin-film coating includes a diamond-like carbon (DLC) material.

* * * * *